United States Patent [19]

Inoue

[11] 4,184,931
[45] Jan. 22, 1980

[54] METHOD OF ELECTROLYTICALLY GENERATING HYDROGEN AND OXYGEN FOR USE IN A TORCH OR THE LIKE

[75] Inventor: Kiyoshi Inoue, Tokyo, Japan

[73] Assignee: Inoue-Japax Research Incorporated, Yokohamashi, Japan

[21] Appl. No.: 884,804

[22] Filed: Mar. 9, 1978

[30] Foreign Application Priority Data

Mar. 10, 1977 [JP] Japan ............................. 52-26319
Dec. 28, 1977 [JP] Japan ............................. 52-157377

[51] Int. Cl.$^2$ .............................................. C25B 1/04
[52] U.S. Cl. ................................................ 204/129
[58] Field of Search ..................................... 204/129

[56] References Cited

U.S. PATENT DOCUMENTS

| 3,652,431 | 3/1972 | Reynolds | 204/129 |
| 3,933,614 | 1/1976 | Bunn | 204/129 |
| 3,954,592 | 5/1976 | Horvath | 204/129 |
| 3,980,053 | 9/1976 | Horvath | 204/129 |

*Primary Examiner*—R. L. Andrews
*Attorney, Agent, or Firm*—Karl F. Ross

[57] ABSTRACT

Hydrogen/oxygen mixtures for combustion in torches or the like are produced by the pulsed electrolysis of an aqueous medium. The pulse duration is 1 to 500 microseconds.

4 Claims, 1 Drawing Figure

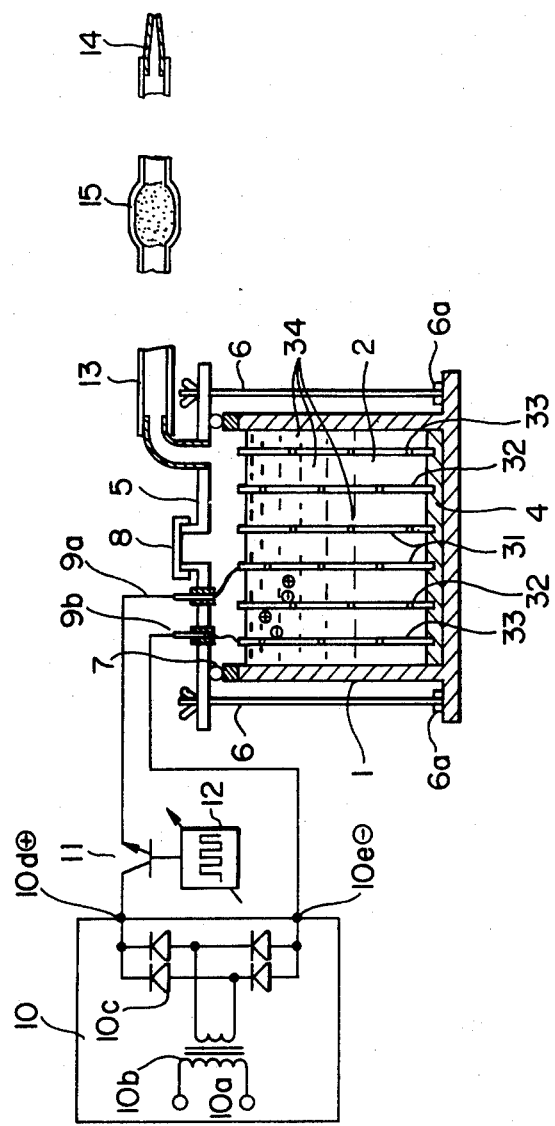

METHOD OF ELECTROLYTICALLY GENERATING HYDROGEN AND OXYGEN FOR USE IN A TORCH OR THE LIKE

FIELD OF THE INVENTION

The present invention relates to an improved method of electrolytically generating hydrogen and oxygen gases for a torch or the like.

BACKGROUND OF THE INVENTION

There has heretofore been known, as described for example in U.S. Pat. No. 3,262,872, the use for a torch or the like of a mixture of hydrogen and oxygen gases generated by electrolytic decomposition of water and ignited to produce a flame for welding, brazing or the like. This technique typically employs a pair of electrodes immersed in electrolytically conductive water and juxtaposed with one another in a tightly closed tank containing the water, the electrodes being energized by a direct-current power supply for passing an electric current therebetween to electrolytically generate hydrogen and oxygen gases. The hydrogen and oxygen gases may be evolved into a space above the surface of the water in the tank to form a mixture thereof which is led through a conduit to a torch or nozzle where it is to be ignited. In order to ensure a stabilized production of the flame from the electrolytically generated gases, it is required or desirable to generate the gases at a sufficient rate and with efficiency, to deliver the gases at a constant amount and under a constant pressure and further to assure that the gases delivered be free from steam, moisture or aqueous condensate (i.e., to be sufficiently dry). To this end, various measures have been proposed including the use of a plurality of electrically conductive cylinders as electrodes concentrically arranged in the water tank for energization by the power supply to produce gases at plural locations as well as the floating of a hydrocarbon in an attempt to control the aqueous evaporation, all with only limited success.

OBJECTS OF THE INVENTION

It is therefore an object of the invention to provide an improved electrolytic hydrogen and oxygen production method whereby the disadvantages which have been encountered in the prior art are overcome or alleviated.

A specific object of the invention is to provide an improved method of the type described which enables continuous generation of a greater amount of hydrogen and oxygen gases and is capable of reducing the steam, moisture or aqueous condensate evolved during the electrolytic decomposition process of water.

SUMMARY OF THE INVENTION

In accordance with the present invention, there is provided a method of electrolytically generating hydrogen and oxygen for a torch or the like, in which an electric current in the form of pulses is applied between at least a pair of electrodes at least partly immersed in electrolytically-conductive water and juxtaposed with one another in a tightly closed tank containing the water. The pulsed electric current, in accordance with a more specific aspect of the invention, has a pulse duration or "on" time not greater than 500 microseconds, preferably not greater than 50 microseconds and practically not less than 1 or 5 microseconds. The pulse "off" time or interval between adjacent pulses should preferably be not less than two times but not greater than thirty times longer than the pulse "on" time or duration.

An apparatus for carrying out the method according to the invention comprises a tightly closed tank for receiving electrolytic water, at least a pair of electrodes at least partly immersed in the electrolytic water and juxtaposed with one another and a power supply connected to said electrodes for passing an electrolyzing current therebetween in the form of pulses with the pulse duration or "on" time, preferably in the range between 5 and 500 microseconds. Preferably, said power supply is adapted to provide time-spaced, discrete electrical pulses with "on" time and "off" time selectively adjustable and may comprise a direct-current source, an electronic switching unit switch-controllable by a control pulser or oscillator with an adjustable control pulse "on" time and "off" time or frequency for alternately connecting and disconnecting said direct-current source across said electrodes so as to pass a pulsed electrolyzing current therebetween with the adjusted pulse duration and interval. The power supply may be alternated, though with less control or adjusting flexibility, by a high-frequency alternating-current source having a rectifier coupled thereto and across the electrodes such that a pulsating current is applied across the electrolyzing electrodes. In this case, the alternating current source preferably has an output frequency in the range between 1 to 500 kHz or the range between 200 Hz to 20 kHz so that the pulsating current for electrolysis has a pulse duration in the range between 1 to 500 microseconds. Alternatively, the power supply may use a capacitor connected across the electrodes in parallel to a direct-current source with a switching unit possibly interposed and circuit parameters being adapted to provide a pulsating electrolyzing current of each pulse duration preferably in the range specified. Such pulsing power supply systems and various modifications thereof are well known and description of further details thereof here are unnecessary.

BRIEF DESCRIPTION OF THE DRAWING

In the drawing, the sole FIGURE is a diagrammatic view illustrating an electrolytic hydrogen and oxygen generator shown in section and partly broken away and including an exemplary power supply assembly shown in a schematic circuit diagram for carrying out the improved method according to the invention.

SPECIFIC DESCRIPTION

The generator illustrated includes a tank 1 containing an aqueous electrolyte or electrolytically-conductive water 2 which is water plus an electrolyte that may, for example, be potassium hydroxide (KOH). In the tank 1, there are provided a plurality of cylindrical electrodes here shown as three cylinders 31, 32 and 33 arranged concentrically and of successively increased diameters. Each of the cylindrical electrodes 31, 32 and 33 fixedly mounted upon an electrically nonconductive base 4 at the bottom of the tank 1 is shown uniformly provided with perforations 34 to allow free passage of the electrolytic water 2 therethrough. A greater number of electrodes may, of course, be provided according to the volume of the tank 1 utilized.

The tank 1 is tightly sealed by a cover 5 which is clamped by means of a plurality of bolts 6 against a sealing gasket 7 interposed between the cover 5 and the tank 1. The bolts 6 are held upright upon the base of the tank 1 and clamped thereon with nuts 6a. A cap 8 is provided on the cover 5 for supply and replenishment of the electrolytic water into the tank 1.

The innermost electrode 31 and the outermost electrode 33 are electrically connected to electrical terminals 9a and 9b, respectively. The power supply assembly illustrated includes a direct-current source 10 here comprising a commercial alternating-current input 10a, a transformer 10b and a rectifier 10c for providing a direct-current potential at the outputs 10d, 10e. The negative output terminal 10e of the DC source 10 are shown connected directly to the electrode terminal 9b while the positive output terminal 10d is shown connected to the electrode terminal 9a via a switch 11 which is here shown comprising a transistor. The switch 11 is on/off controlled by an oscillator or control pulser 12 (e.g. a multivibrator of conventional design or equivalent thereof) of adjustable "on" time, "off" time and frequency of output control pulses to apply between the terminals 9a and 9b and hence between the electrodes 31 and 33 a succession of pulses of preset "on" time, "off" time and frequency, with the pulse "on" time or duration preferably in the range not greater than 500 microseconds, more preferably not greater than 50 microseconds and practically not less than 1 or 5 microseconds, and the pulse "off" time or interval preferably not less than two times but not greater than thirty times longer than the pulse "on" time or duration as mentioned previously.

As a consequence, an electrolyzing current is passed between the electrodes 31 and 32 and between the electrodes 32 and 33 with hydrogen evolving from the inner surfaces of the electrodes 32 and 33 and oxygen from the outer surfaces of the electrodes 31 and 32. The mixture of hydrogen and oxygen gases collected in the space in the tank 1 above the water surface is led with a conduit 13 to a torch 14, at which it is ignited, through a flash-back arrestor 15. The latter may contain metallic particles, mesh, fibers, wools or porous bodies to additionally serve as a filter.

The pulsed electrolysis of water according to the invention has been found to be extremely advantageous in comparison with continuous electrolysis as is the practice of the prior art. It permits the current density to be greatly enhanced leading to a larger amount of both hydrogen and oxygen gases being generated. This appears to result partly from the cooling of water effected during pulse intervals. Even more significant is the fact that a drier gas mixture with less moisture generated is obtained which enables a stabilized flame of an elevated temperature to result at the torch or nozzle 14 continuously without the failure of ignition.

EXAMPLE

Following the conventional practice, a stationary direct-current of 1 ampere was passed through an aqueous solution containing 20% by weight potassium hydroxide with the result of the rate of gas production of 55 cc/min and the gases containing 15%. In comparison, when a pulsed electrolyzing current of pulse "on" time and "off" time both of 20 microseconds was employed in accordance with the invention, the gases were produced at a rate of 68 cc/min and contained less than 3% moisture. The resulting flame had an increased stability and higher temperature.

The pulsed electrolysis according to the invention is especially remarkable in its effect when the pulse "on" time or duration is in the range not greater than 500 microseconds, preferably not greater than 50 microseconds and practically not less than 1 or 5 microseconds and the pulse "off" time or interval as mentioned earlier.

The pulse duration and possibly also the interval may be adjusted in observing the stability of the flame created at the torch. As mentioned earlier, therefore, it is desirable to design the pulser adjustable as to the pulse duration and interval or frequency in sufficient widths.

I claim:

1. A method of operating a torch, comprising the steps of:
    electrolytically generating hydrogen and oxygen by passing an electric current in the form of pulses of a duration not greater than 50 microseconds between at least a pair of electrodes at least partly immersed in electrolytically conductive water and juxtaposed with one another in a tightly closed tank containing the water;
    feeding the hydrogen and oxygen thus produced to a torch nozzle to form a mixture; and
    igniting said mixture at said nozzle.

2. The method according to claim 1, in which the pulse interval between adjacent pulses is not less than two times but not greater than thirty times longer than the pulse duration.

3. The method according to claim 1 in which said electrodes are constituted by a plurality of electrically conductive cylinders concentrically arranged in said tank and of successively increased diameters, said electric current in the form of pulses being applied between the innermost electrode and the outermost electrode with one or more intermediate electrodes forming bipolar electrodes.

4. The method according to claim 1, in which the innermost electrode is poled anodic and the outermost electrode is poled cathodic.

* * * * *